US007583925B2

(12) United States Patent  
Karasawa (10) Patent No.: US 7,583,925 B2  
(45) Date of Patent: Sep. 1, 2009

(54) LUBRICANT APPLICATION DEVICE, PROCESS CARTRIDGE, AND IMAGE FORMING APPARATUS

(75) Inventor: Shinya Karasawa, Kawasaki (JP)

(73) Assignee: Ricoh Company Limited, Tokyo (JP)

( * ) Notice: Subject to any disclaimer, the term of this patent is extended or adjusted under 35 U.S.C. 154(b) by 169 days.

(21) Appl. No.: 11/866,719

(22) Filed: Oct. 3, 2007

(65) Prior Publication Data

US 2008/0118285 A1    May 22, 2008

(30) Foreign Application Priority Data

Oct. 5, 2006    (JP)    ............................. 2006-273927

(51) Int. Cl.  
*G03G 21/00*    (2006.01)

(52) U.S. Cl. ...................... 399/346; 399/353

(58) Field of Classification Search ................ 399/107, 399/111, 123, 343, 349, 353; 15/256.5, 256.51, 15/256.52  
See application file for complete search history.

(56) References Cited

U.S. PATENT DOCUMENTS 6,760,562 B2 *    7/2004    Nishida et al. ............... 399/297

7,035,582 B2 *    4/2006    Suda et al. ................... 399/346  
7,209,699 B2 *    4/2007    Yamaguchi et al. ......... 399/346

FOREIGN PATENT DOCUMENTS

| JP | 2000-172119 | 6/2000 |
| JP | 2001-337558 | 12/2001 |
| JP | 3291354 | 3/2002 |
| JP | 3373651 | 11/2002 |
| JP | 2004-251940 | 9/2004 |
| JP | 2006-3537 | 1/2006 |
| JP | 2006-258989 | 9/2006 |

* cited by examiner

*Primary Examiner*—Hoan H Tran  
(74) *Attorney, Agent, or Firm*—Oblon, Spivak, McClelland, Maier & Neustadt, P.C.

(57) ABSTRACT

A lubricant application device including a solid lubricant, a brush, and a first lubricant scattering prevention member. The solid lubricant is in a non-contact state with a rotating member and provided below a horizontal line of an axis of the rotating member. The brush rotates and contacts both the solid lubricant and the rotating member. The first lubricant scattering prevention member is provided downstream from a first contact position at which the brush contacts the solid lubricant and upstream from a second contact position at which the brush contacts the rotating member in a direction of rotation of the brush.

19 Claims, 9 Drawing Sheets

LUBRICANT APPLICATION DEVICE, PROCESS CARTRIDGE, AND IMAGE FORMING APPARATUS

CROSS-REFERENCE TO RELATED APPLICATION

The present application is based on and claims priority from Japanese Patent Application No. 2006-273927, filed on Oct. 5, 2006 in the Japan Patent Office, the entire contents of which are hereby incorporated herein by reference.

BACKGROUND OF THE INVENTION

1. Field of the Invention

Exemplary aspects of the present invention relates to a lubricant application device, a process cartridge, and an image forming apparatus, and more particularly, to a lubricant application device, a process cartridge, and an image forming apparatus for preventing a lubricant from scattering and efficiently applying the lubricant.

2. Description of the Related Art

A related-art image forming apparatus, such as a copying machine, a facsimile machine, a printer, or a multifunction printer having two or more of copying, printing, scanning, and facsimile functions, forms a toner image on a recording medium (e.g., a sheet) according to image data by electrophotography. For example, a charger charges a surface of a photoconductor. An optical writer emits a light beam onto the charged surface of the photoconductor to form an electrostatic latent image on the photoconductor according to the image data. A developing device develops the electrostatic latent image with a developer (e.g., toner) to form a toner image on the photoconductor. The toner image is transferred from the photoconductor onto a sheet via an intermediate transfer belt. A cleaner (e.g., a cleaning blade) cleans the surface of the photoconductor after the toner image is transferred from the photoconductor. A fixing device applies heat and pressure to the sheet bearing the toner image to fix the toner image on the sheet. Thus, the toner image is formed on the sheet.

Before the cleaning blade cleans the surface of the photoconductor, a lubricant is applied to the photoconductor. Insufficient application of the lubricant causes filming of the photoconductor and wear of the cleaning blade. Further, removal of polymerized toner or toner having a toner particle diameter of about 6 μm or smaller is difficult, and in order to aid removal by the cleaning blade the toner includes particulate silica having a large particle diameter of from about 80 nm to about 350 nm.

An accumulation of silica in an edge portion of the cleaning blade prevents the toner from slipping through the cleaning blade. However, filming of the photoconductor and abnormal wear of the cleaning blade may occur as a result. Therefore, the lubricant needs to be applied to the photoconductor in order to prevent the filming of the photoconductor and abnormal wear on the cleaning blade due to the silica.

As a lubricant application method, application of a solid lubricant to the photoconductor via a rotating brush roller is effective in terms of cost, a small number of components, and the like. The rotating brush roller scrapes the solid lubricant and applies the scraped lubricant to the photoconductor. However, when bristles of the rotating brush roller contact the solid lubricant and stand up, and when the bristles contact the photoconductor and stand up, scraped powder of the solid lubricant adhered to the brush roller may scatter.

Figure 1:
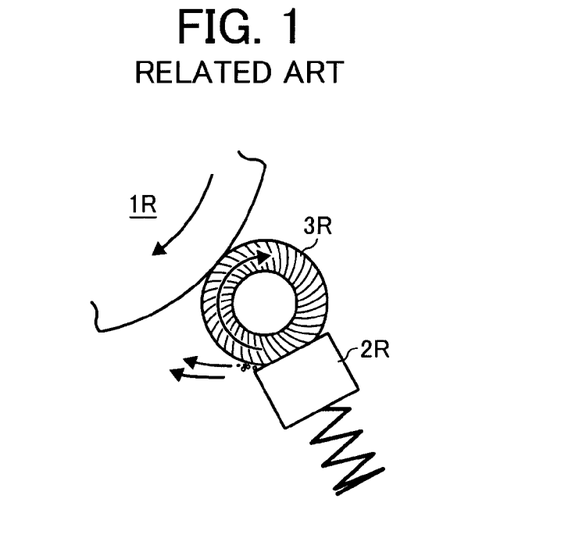
FIG. 1 is a sectional view of a lubricant application device of a related-art image forming apparatus.
Figure 2:
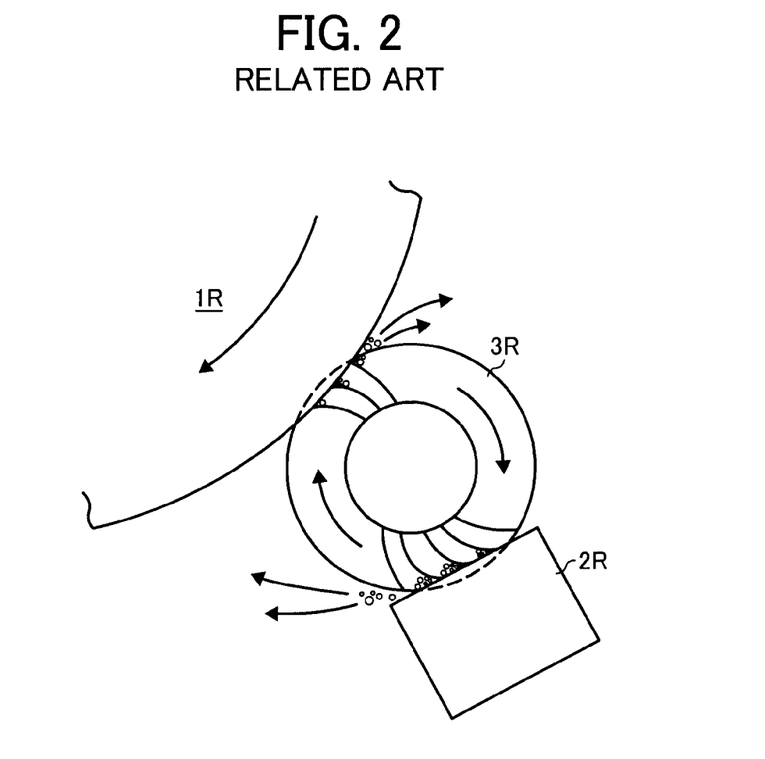
FIG. 2 is an enlarged view of the lubricant application device shown in FIG. 1.

FIGS. 1 and 2 illustrate a brush roller 3R and a solid lubricant 2R included in one example of a related-art image forming apparatus. The solid lubricant 2R presses against the brush roller 3R. Rotation of the brush roller 3R scrapes the solid lubricant 2R into a powdery lubricant, and the powdery lubricant is applied to a photoconductor 1R. As illustrated in FIG. 2, when the rotating brush roller 3R contacts the solid lubricant 2R, bristles of the brush roller 3R fall down or are bent, and after the brush roller 3R contacts the solid lubricant 2R, the fallen bristles stand up. Restitution force of the bristles of the brush roller 3R causes the lubricant adhered to the bristles to scatter and adhere to a vicinity of the brush roller 3R inside the image forming apparatus. Similarly, when the rotating brush roller 3R contacts the photoconductor 1R, bristles of the brush roller 3R fall down or are bent, and after the brush roller 3R contacts the photoconductor 1R, the fallen bristles stand up. Restitution force of the bristles of the brush roller 3R causes the lubricant adhered to the bristles to scatter and adhere to another vicinity of the brush roller 3R inside the image forming apparatus.

BRIEF SUMMARY OF THE INVENTION

This specification describes a lubricant application device according to an exemplary embodiment of the present invention. In one exemplary embodiment of the present invention, the lubricant application device includes a solid lubricant, a brush, and a first lubricant scattering prevention member. The solid lubricant is configured to be in a non-contact state with a rotating member and provided below a horizontal line of an axis of the rotating member. The brush is configured to rotate and contact both the solid lubricant and the rotating member. The first lubricant scattering prevention member is provided downstream from a first contact position at which the brush contacts the solid lubricant and upstream from a second contact position at which the brush contacts the rotating member in a direction of rotation of the brush.

This specification further describes a process cartridge according to an exemplary embodiment of the present invention. In one exemplary embodiment of the present invention, the process cartridge includes an image carrier and a lubricant application device. The image carrier is configured to carry an image. The lubricant application device is configured to apply a lubricant to the image carrier. The lubricant application device includes a solid lubricant, a brush, and a first lubricant scattering prevention member. The solid lubricant is configured to be in a non-contact state with the image carrier and provided below a horizontal line of an axis of the image carrier. The brush is configured to rotate and contact both the solid lubricant and the image carrier. The first lubricant scattering prevention member is provided downstream from a first contact position at which the brush contacts the solid lubricant and upstream from a second contact position at which the brush contacts the image carrier in a direction of rotation of the brush.

This specification further describes an image forming apparatus according to an exemplary embodiment of the present invention. In one exemplary embodiment of the present invention, the image forming apparatus includes an image carrier and a lubricant application device. The image carrier is configured to carry an image. The lubricant application device is configured to apply a lubricant to the image carrier. The lubricant application device includes a solid lubricant, a brush, and a first lubricant scattering prevention member. The solid lubricant is configured to be in a non-contact state with a rotating member and provided below a horizontal line of an axis of the rotating member. The brush is configured to rotate and contact both the solid lubricant and the rotating member. The first lubricant scattering prevention member is provided downstream from a first contact position at which the brush contacts the solid lubricant and upstream from a second contact position at which the brush contacts the rotating member in a direction of rotation of the brush.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein.

DETAILED DESCRIPTION OF THE INVENTION

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 3:
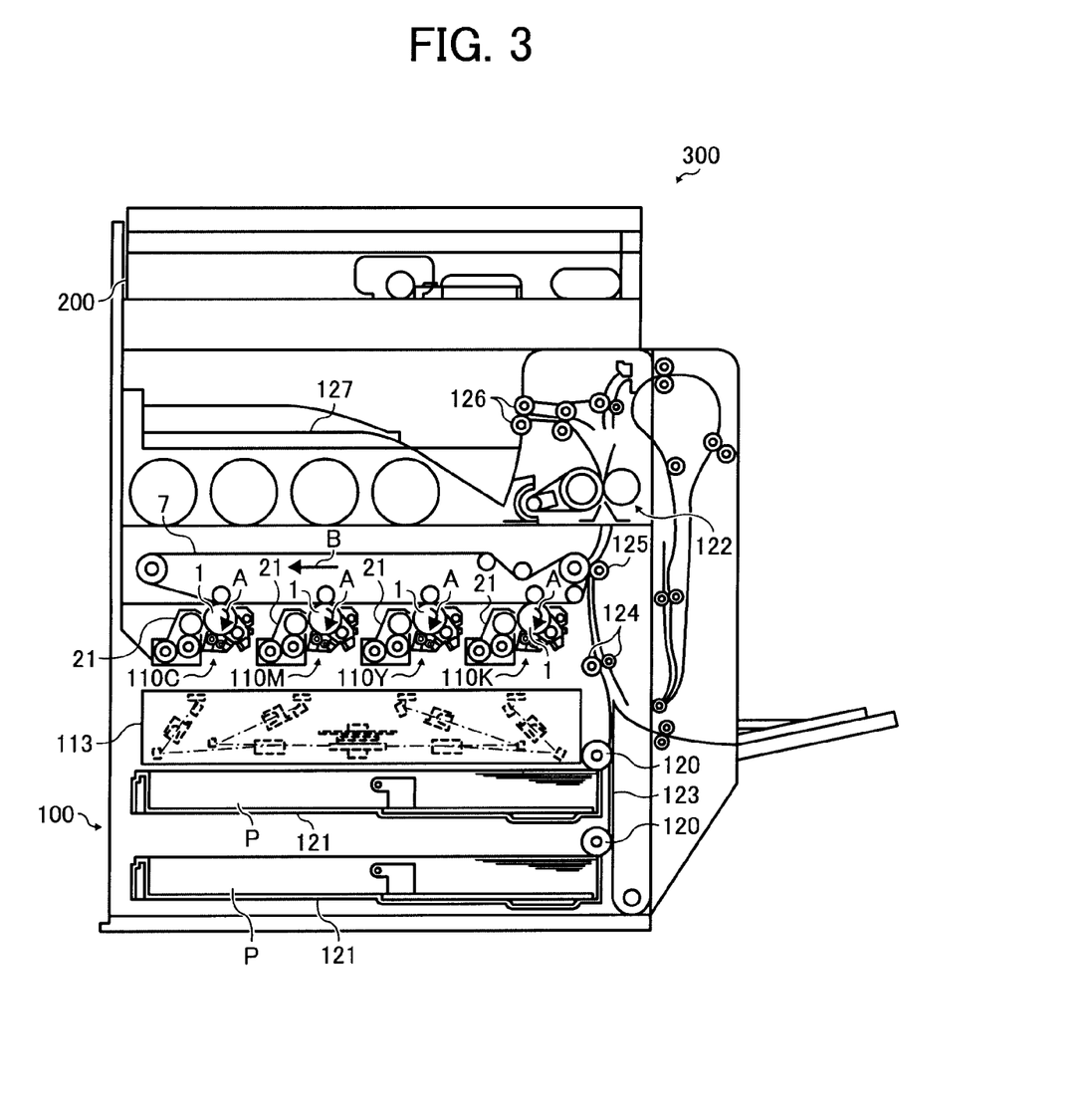
FIG. 3 is a schematic view of an image forming apparatus according to an exemplary embodiment of the present invention.

Referring now to the drawings, wherein like reference numerals designate identical or corresponding parts throughout the several views, in particular to FIG. 3, an image forming apparatus 300 according to an exemplary embodiment of the present invention is explained.

FIG. 3 illustrates one example of a tandem type full color image forming apparatus 300 including a process cartridge (PCU) including a lubricant application device. In FIG. 3, the process cartridge including a photoconductor is shown. However, the process cartridge may include an image carrier used for intermediate transfer and secondary transfer.

The image forming apparatus 300 includes an image reader 200 and a body 100. The body 100 includes image forming stations 110C, 110M, 110Y, and 110K, a writer 113, an intermediate transfer belt 7, feeding rollers 120, paper trays 121, a conveyance path 123, a registration roller pair 124, a secondary transfer device 125, a fixing device 122, a discharging roller pair 126, and a stacking device 127. The image forming stations 110C, 110M, 110Y, and 110K include photoconductors 1 and developing devices 21, respectively.

The image reader 200 is provided on the body 100. In the body 100, the image forming stations 110C, 100M, 110Y, and 110K, serving as process cartridges, are arranged in tandem. Each of the photoconductors 1 has a drum-like shape and serves as an image carrier or a rotating member. Chargers, not shown, including charging rollers apply bias voltage to the photoconductors 1 rotating clockwise (e.g., a direction of rotation A) to uniformly charge surfaces of the photoconductors 1, respectively. Based on a reading signal transmitted by the image reader 200, the writer 113 performs writing by irradiating laser beams to form electrostatic latent images on the photoconductors 1. The respective development devices 21 attach powdery toner in cyan, magenta, yellow, and black colors to the electrostatic latent images formed on the photoconductors 1 to make visible the electrostatic latent images, such that cyan, magenta, yellow, and black toner images are formed on the photoconductors 1, respectively.

The intermediate transfer belt 7 has an endless belt-like shape and rotates counterclockwise (e.g., a direction of rotation B) while contacting the photoconductors 1. The respective primary transfer devices, not shown, transfer the cyan, magenta, yellow, and black toner images formed on the photoconductors 1 onto the intermediate transfer belt 7. The transferred toner images are superimposed to form a full color toner image on the intermediate transfer belt 7.

One of the feeding rollers 120 selectively rotates to feed a recording medium P from the corresponding paper tray 121. The recording medium P is conveyed through the conveyance path 123, and is temporarily stopped by the registration roller pair 124.

The registration roller pair 124 rotates at a proper time when the full color toner image formed on the intermediate transfer belt 7 is transferred onto the recording medium P by the secondary transfer device 125. The recording medium P bearing the full color toner image is conveyed upwards through the conveyance path 123. When the recording medium P passes through a fixing nip of the fixing device 122, the full color toner image is affixed to the recording medium P. The discharging roller pair 126 discharges the recording medium P bearing the fixed toner image onto the stacking device 127.

According to this non-limiting exemplary embodiment, the process cartridge includes the photoconductor 1, the charger, and the development device 21. However, the process cartridge may also include at least an image carrier (e.g., the photoconductor 1 and/or the intermediate transfer belt 7) and a lubricant application device (described below).

Figure 4:
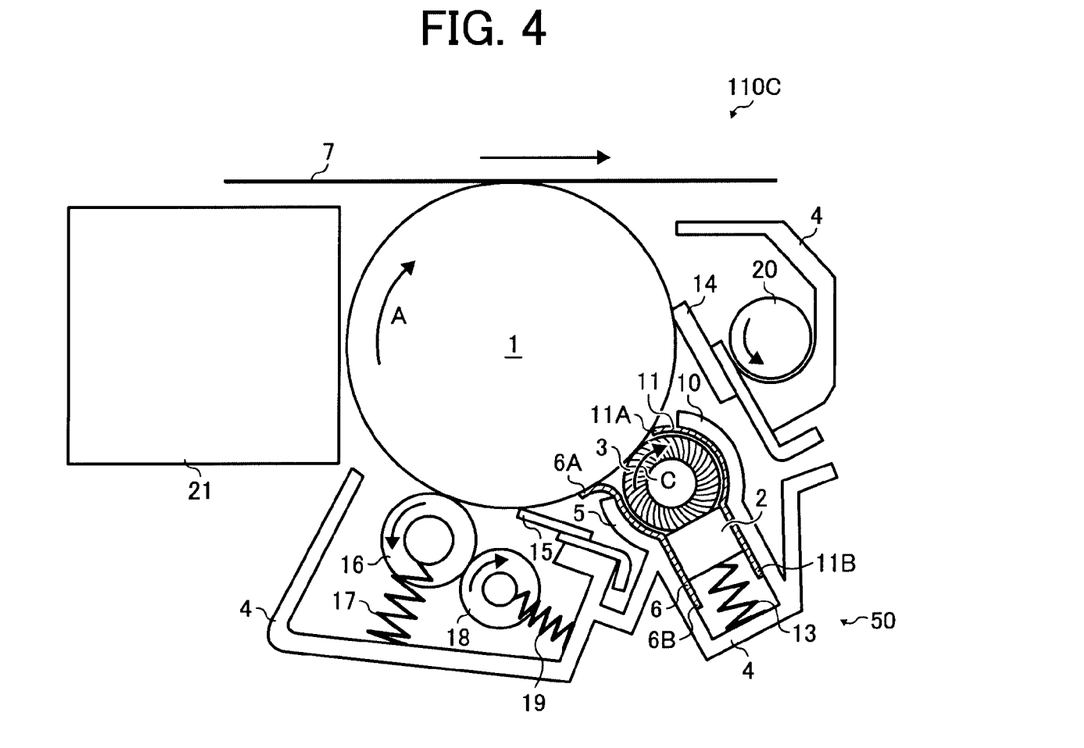
FIG. 4 is a schematic view of a process cartridge included in the image forming apparatus shown in FIG. 3.

FIG. 4 is a sectional view of the image forming station 110C. The image forming station 110C further includes a lubricant application device 50, a cleaning blade 14, a lubricant application blade 15, a charging roller 16, a pressurizing spring 17, a charging roller cleaner 18, a pressurizing spring 19, and a waste toner collection coil 20. The lubricant application device 50 includes a solid lubricant 2, a brush roller 3, lubricant scattering prevention members 5 and 10, a casing 4, sheets 6 and 11, and a lubricant pressurizing spring 13. The sheets 6 and 11 include top edges 6A and 11A, and base edges 6B and 11B. The image forming stations 110M, 110Y, and 110K have the same structure as that of the image forming station 110C, and therefore redundant descriptions thereof are omitted here.

Figure 5:
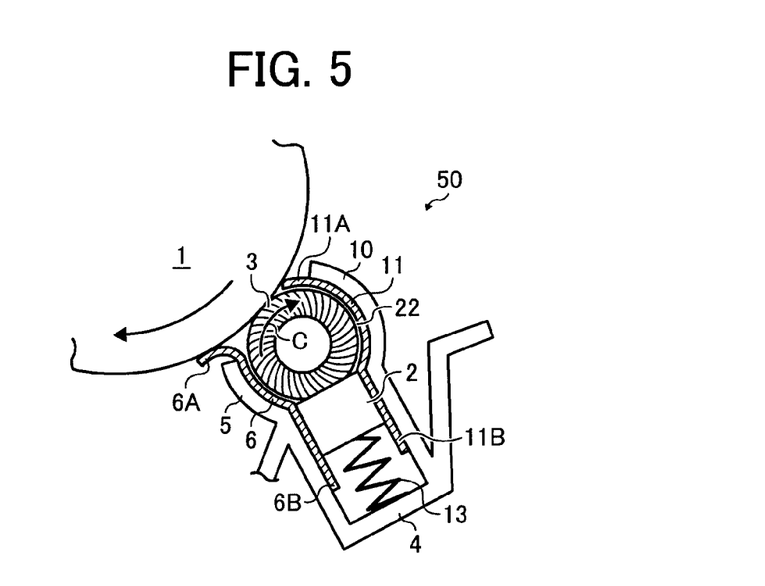
FIG. 5 is a sectional view of a lubricant application device included in the process cartridge shown in FIG. 4.

FIG. 5 is an enlarged sectional view of the lubricant application device 50. The lubricant application device 50 further includes a space 22.

As illustrated in FIG. 4, the lubricant application device 50 applies a lubricant to the photoconductor 1. The solid lubricant 2 and the brush roller 3 are provided below a horizontal line of an axis of the photoconductor 1. The brush roller 3, serving as a brush, contacts both the photoconductor 1 and the solid lubricant 2, and rotates in a direction of rotation C. The lubricant scattering prevention member 5, serving as a first lubricant scattering prevention member, is provided downstream from a contact position, serving as a first contact position, at which the brush roller 3 contacts the solid lubricant 2 and upstream from a contact position, serving as a second contact position, at which the brush roller 3 contacts the photoconductor 1 in the direction of rotation C of the brush roller 3. The lubricant scattering prevention member 5 has a curved, circular shape concave with respect to the brush roller 3 so as to accommodate same. The casing 4, serving as a frame, is provided integrally with the lubricant scattering prevention member 5. The sheet 6 includes a slidable thin sheet, and is provided inside the lubricant scattering prevention member 5 and the casing 4, parallel to the axis of the photoconductor 1 and longer than the brush roller 3. A top edge 6A protruding from an opening, described below, is in contact with the photoconductor 1, and a base edge 6B is in contact with the solid lubricant 2.

The lubricant scattering prevention member 10, serving as a second lubricant scattering prevention member, is provided upstream from the contact position at which the brush roller 3 contacts the solid lubricant 2 and downstream from the contact position at which the brush roller 3 contacts the photoconductor 1 in the direction of rotation C of the brush roller 3. The lubricant scattering prevention member 10 has a curved, circular shape concave with respect to the brush roller 3 so as to accommodate the same. The casing 4, serving as a frame, is provided integrally with the lubricant scattering prevention member 10. The sheet 11 includes a slidable thin sheet, and is provided inside the lubricant scattering prevention member 10 and the casing 4, parallel to the axis of the photoconductor 1 and longer than the brush roller 3. A top edge 11A protruding from an opening, described below, is in contact with the photoconductor 1, and a base edge 11B is in contact with the solid lubricant 2.

A structure of the casing 4 holding the solid lubricant 2 is described below in greater detail. The casing 4 includes circular parts serving as the lubricant scattering prevention members 5 and 10, a box-like part, and end portions in an axial direction of the brush roller 3. The circular parts are formed so as to have an opening disposed opposite the photoconductor 1. For example, an opening is provided between the photoconductor 1 and a side of each of the circular parts disposed opposite the photoconductor 1. The box-like part is formed integrally with the circular parts at the opposite side of the opening. The circular parts and the box-like part extend in the axial direction of the brush roller 3. The end portions cover both ends of the brush roller 3 in the axial direction of the brush roller 3. No opening other than the opening provided between the photoconductor 1 and each of the circular parts is provided.

The brush roller 3 is concentrically disposed with the circular parts, and the end portions support both ends of the axis of the brush roller 3. Accordingly, as illustrated in FIG. 5, the space 22 is circularly formed between the circular parts and the brush roller 3. The lubricant pressurizing spring 13 is provided at a bottom of the box-like part, and applies a force to the solid lubricant 2 to cause the solid lubricant 2 to contact the brush roller 3.

The base edges 6B and 11B of the sheets 6 and 11, respectively, are preferably provided below a lowest part of a portion where the solid lubricant 2 slides over the box-like part of the casing 4. The base edges 6B and 11B may be separated from each other near the bottom of the box-like part, or they may form a single integrated unit that covers the bottom. Arrangement of the base edges 6B and 11B on a side of the solid lubricant 2 or on a surface of the solid lubricant 2 facing the brush roller 3 may cause the solid lubricant 2 to improperly slide over the casing 4 or may cause lubricant to scatter from the brush roller 3. Integration of the sheets 6 and 11 into a single sheet may improve sliding movement of the solid lubricant 2 over the box-like part of the casing 4 as well as prevention of scattering of the lubricant, and may also provide efficiency of installation and a reduction in the number of constituent parts, resulting in cost reduction.

The cleaning blade 14 and the lubricant application blade 15 are provided in the casing 4 at positions upstream and downstream from the lubricant application device 50 in the direction of rotation A of the photoconductor 1, respectively. The charging roller 16 charges the photoconductor 1. The pressurizing spring 17 applies a force to the charging roller 16 to urge the charging roller 16 towards the photoconductor 1. The charging roller cleaner 18 (e.g., a cleaning roller) cleans the charging roller 16. The pressurizing spring 19 applies a force to the charging roller cleaner 18 to urge the charging roller 18 towards the charging roller 16. The waste toner collection coil 20 collects waste toner removed by the cleaning blade 14 from the photoconductor 1.

Figure 6:
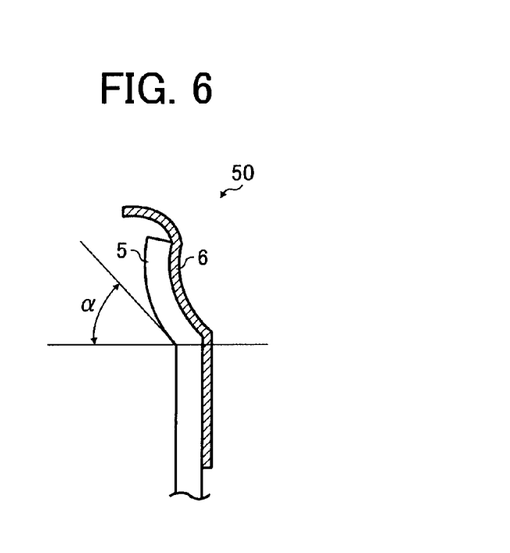
FIG. 6 illustrates an angle formed between a horizontal line and a tangential line of a lubricant scattering prevention member included in the lubricant application device shown in FIG. 5.

As illustrated in FIG. 6, a horizontal line and a tangential line of the lubricant scattering prevention member 5 in the direction of rotation C of the brush roller 3 (depicted in FIG. 5) preferably form an angle α at which the circular part of the lubricant scattering prevention member 5 contacts the solid lubricant 2 (depicted in FIG. 5) of from about 45 degrees to about 90 degrees. A horizontal line and a tangential line of the lubricant scattering prevention member 10 (depicted in FIG. 5) in a direction opposite to the direction of rotation C of the brush roller 3 preferably form an angle α at which the circular part of the lubricant scattering prevention member 10 contacts the solid lubricant 2 of from about 45 degrees to about 90 degrees. Friction coefficients between the lubricant scattering prevention member 5 and the photoconductor 1 (depicted in FIG. 5), and between the lubricant scattering prevention member 5 and the solid lubricant 2, are preferably not greater than about 0.20. Friction coefficients between the lubricant scattering prevention member 10 and the photoconductor 1, and between the lubricant scattering prevention member 10 and the solid lubricant 2, are preferably not greater than about 0.20.

As illustrated in FIG. 5, according to this non-limiting exemplary embodiment, the sheets 6 and 11 are provided across entire inner surfaces of the lubricant scattering prevention members 5 and 10, respectively. Alternatively, however, the sheets 6 and 11 may not be provided on the entire inner surfaces. For example, the top edges 6A and 11A and the base edges 6B and 11B may be provided, while middle portions of the sheets 6 and 11 are omitted. Also, according to this non-limiting exemplary embodiment, the sheets 6 and 11 are provided separately from the lubricant scattering prevention members 5 and 10, respectively. Alternatively, however, the sheets 6 and 11 may be integrated with the lubricant scattering prevention members 5 and 10, respectively.

The lubricant scattering prevention member 5 prevents the lubricant from scattering after the rotating brush roller 3 contacts the solid lubricant 2. Even when the lubricant scatters in the space 22 surrounded by the lubricant scattering prevention member 5, the photoconductor 1, the brush roller 3, and the solid lubricant 2, the lubricant is adhered to the brush roller 3 or the photoconductor 1 due to an airflow generated by rotation of the brush roller 3. Alternatively, the scattered lubricant falls down along the lubricant scattering prevention member 5 and returns to the solid lubricant 2 by gravity. The returned lubricant is supplied by the brush roller 3 again, and applied to the photoconductor 1.

Similarly, the lubricant scattering prevention member 10 prevents the lubricant from scattering after the rotating brush roller 3 contacts the photoconductor 1. Even when the lubricant scatters in the space 22 surrounded by the lubricant scattering prevention member 10, the photoconductor 1, the brush roller 3, and the solid lubricant 2, the lubricant is supplied to the brush roller 3 due to an airflow generated by rotation of the brush roller 3, or returns to the solid lubricant 2. Alternatively, the scattered lubricant falls down along the lubricant scattering prevention member 10 and returns to the solid lubricant 2 by gravity. The returned lubricant is supplied by the brush roller 3 again, and applied to the photoconductor 1.

Conventionally, the lubricant scattered to the cleaning blade 14 and the lubricant application blade 15 or into the casing 4 is not applied to the photoconductor 1. However, the scattered lubricant may be applied to the photoconductor 1 according to this non-limiting exemplary embodiment. Therefore, an amount of the solid lubricant 2 to be scraped by the brush roller 3 may be reduced, thus extending a lifetime of the solid lubricant 2. Specifically, a combination of the lubricant scattering prevention members 5 and 10 and the casing 4 may prevent the lubricant from scattering from the space 22 to the casing 4 at positions provided upstream and downstream from the contact position at which the brush roller 3 contacts the solid lubricant 2 in the direction of rotation C of the brush roller 3.

Figure 7:
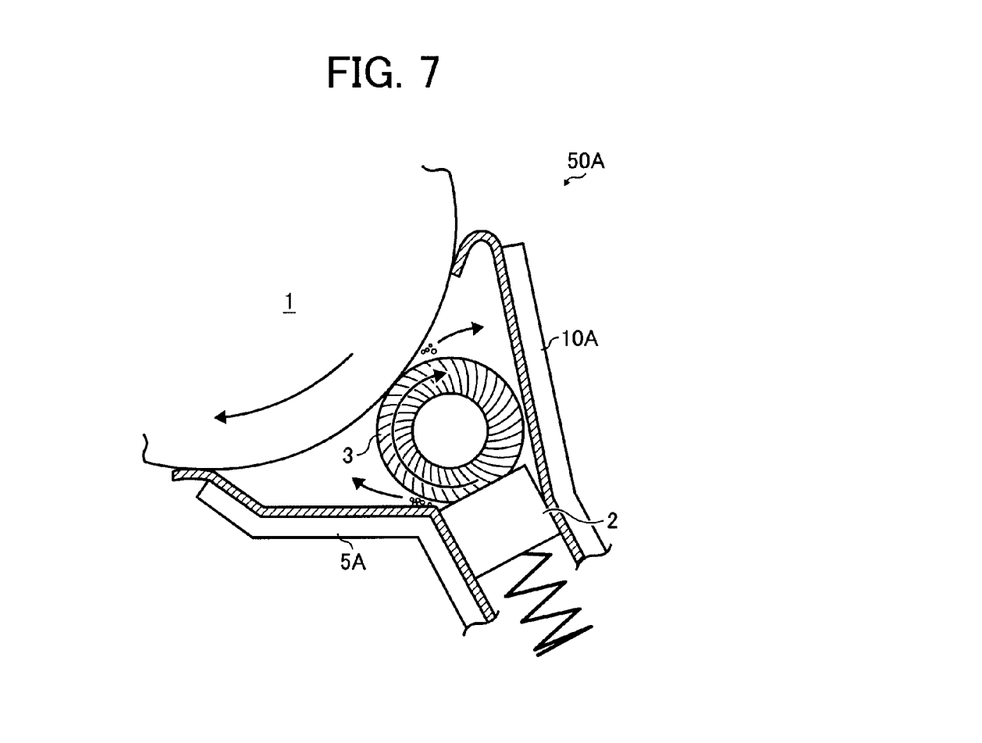
FIG. 7 is a sectional view of one example of a lubricant scattering prevention member included in the lubricant application device shown in FIG. 5.

FIG. 7 illustrates a lubricant application device 50A. The lubricant application device 50A includes lubricant scattering prevention members 5A and 10A. The other elements of the lubricant application device 50A are common to the lubricant application device 50 depicted in FIG. 5. The lubricant scattering prevention members 5A and 10A include a linear shape and are not provided close to the brush roller 3. In the lubricant application device 50A, a decreased amount of scattered lubricant adheres to the brush roller 3 and the photoconductor 1, thereby causing larger consumption of the solid lubricant 2 than in the lubricant application device 50.

Figure 8:
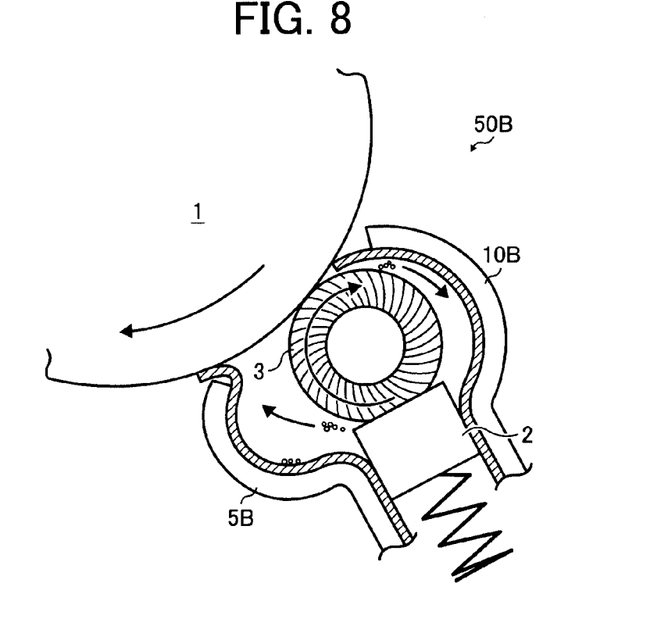
FIG. 8 is a sectional view of another example of a lubricant scattering prevention member included in the lubricant application device shown in FIG. 5.

FIG. 8 illustrates a lubricant application device 50B. The lubricant application device 50B includes lubricant scattering prevention members 5B and 10B. The other elements of the lubricant application device 50B are common to the lubricant application device 50 depicted in FIG. 5. A horizontal line and a tangential line of the lubricant scattering prevention member 5B contacting the solid lubricant 2 form an angle of less than zero degrees. Thus, the lubricant scattering prevention member 5B includes a concave portion. A scattered lubricant may remain in the concave portion, and may not return to the brush roller 3 and the solid lubricant 2. As a result, consumption of the solid lubricant 2 may not be reduced.

Figure 9:
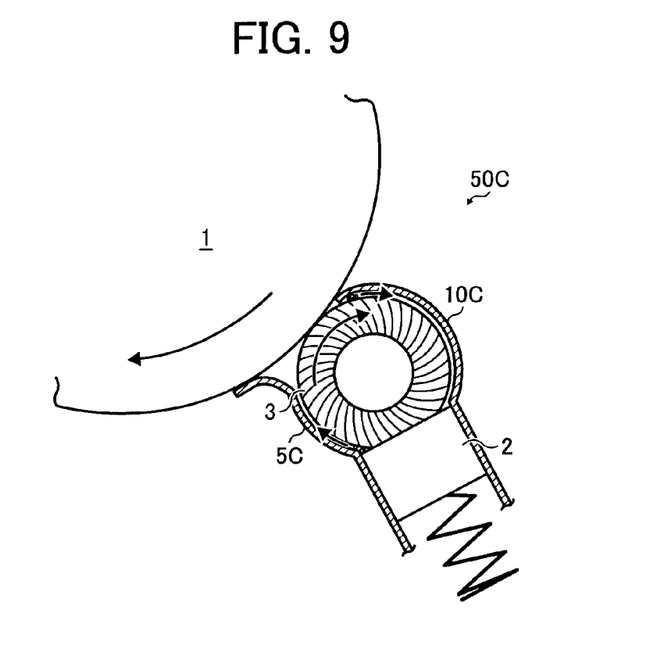
FIG. 9 is a sectional view of yet another example of a lubricant scattering prevention member included in the lubricant application device shown in FIG. 5.

FIG. 9 illustrates a lubricant application device 50C. The lubricant application device 50C includes lubricant scattering prevention members 5C and 10C. The other elements of the lubricant application device 50C are common to the lubricant application device 50 depicted in FIG. 5. The whole lubricant scattering prevention members 5C and 10C are formed of a sheet-like member. Thus, the sheet-like member may become deformed and come into contact with the brush roller 3. As a result, a proper amount of lubricant may not be supplied. Therefore, the lubricant scattering prevention members 5C and 10C need to be reinforced by a non-deforming material for preventing the deformation of the sheet-like member.

As illustrated in FIG. 5, according to the above-described exemplary embodiment, the two lubricant scattering prevention members 5 and 10 may prevent the lubricant from scattering in the space 22 formed among the photoconductor 1, the solid lubricant 2, and the brush roller 3, and may reduce the consumption of the solid lubricant 2 so that the lifetime of the solid lubricant 2 may be extended.

Specifically, by providing the lubricant scattering prevention member 5, after the rotating brush roller 3 contacts the solid lubricant 2, the lubricant scatters into the space 22 surrounded by the lubricant scattering prevention member 5, the photoconductor 1, the brush roller 3, and the solid lubricant 2, and does not scatter from the opening. Accordingly, contamination inside the casing 4 may be prevented. By forming the lubricant scattering prevention member 5 into a circular shape, and providing the space 22 between the brush roller 3 and the lubricant scattering prevention member 5 having a width (e.g., a gap) of from about 0.5 mm to about 5 mm, the lubricant is adhered to the brush roller 3 or the photoconductor 1 by an airflow generated by the rotation of the brush roller 3, or the lubricant scattered by gravity is adhered to the solid lubricant 2.

Further, by providing the lubricant scattering prevention member 10, after the rotating brush roller 3 contacts the photoconductor 1, the lubricant scatters into the space 22 surrounded by the lubricant scattering prevention member 10, the photoconductor 1, the brush roller 3, and the solid lubricant 2, and does not scatter from the opening. Accordingly, contamination inside the casing 4 may be prevented. By forming the lubricant scattering prevention member 10 into a circular shape, and providing the space 22 between the brush roller 3 and the lubricant scattering prevention member 10 having a width (e.g., a gap) of from about 0.5 mm to about 5 mm, the lubricant is adhered to the brush roller 3 or the solid lubricant 2 by an airflow generated by the rotation of the brush roller 3, or the lubricant scattered by gravity is adhered to the solid lubricant 2. Therefore, although the scattered lubricant is not applied to the photoconductor 1 in the conventional techniques, the scattered lubricant may be applied to the photoconductor 1 in the lubricant application device 50 according to this non-limiting exemplary embodiment. Thus, the amount of the solid lubricant 2 to be scraped by the brush roller 3 may be reduced so that the lifetime of the solid lubricant 2 may be extended.

The following describes an evaluation test of the lubricant scattering prevention members 5 and 10. An image forming apparatus B including the lubricant scattering prevention members 5 and 10 is compared with a conventional image forming apparatus A not including the lubricant scattering prevention members 5 and 10.

Test conditions are as follows. The evaluation is performed after feeding sheets based on consumption of a solid lubricant and a state of the scattered lubricant around the brush roller 3.

Figure 10:
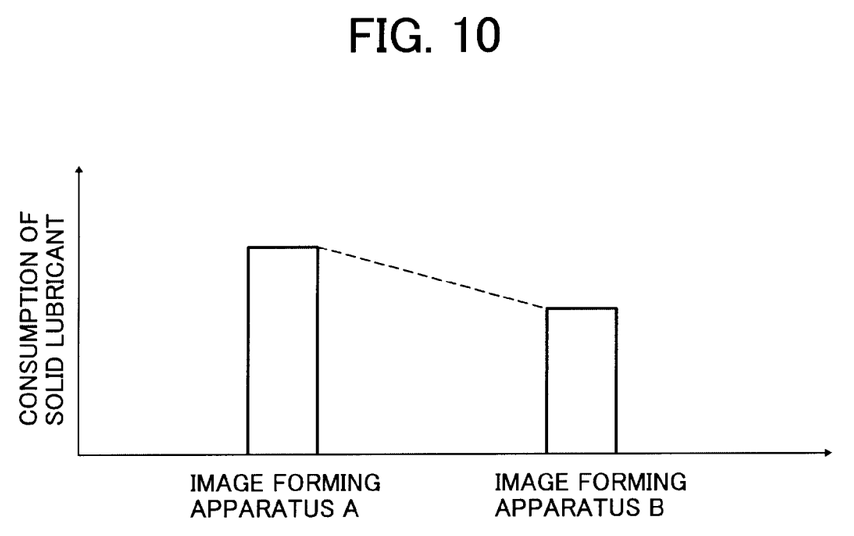
FIG. 10 is a graph illustrating consumption of a solid lubricant of a related-art image forming apparatus and an image forming apparatus including a lubricant scattering prevention member included in the lubricant application device shown in FIG. 5.

Machine: Ricoh Imagio MP C3000 (modified machine)
    Environment: laboratory
    Image sheet: 5% chart
    Interval of job: every 100 sheets continuously fed
    Total number of sheets: 10,000 sheets Evaluation result: As shown in FIG. 10, the consumption of the solid lubricant of the image forming apparatus B was reduced by about 30% compared to the image forming apparatus A. Further, as shown in Table 1 below, a result of evaluation of the state of the scattered lubricant around the brush roller 3 shows that the image forming apparatus B prevents scattering of the lubricant more effectively than the image forming apparatus A.

TABLE 1

|  | Image forming apparatus A | Image forming apparatus B |
| --- | --- | --- |
| Evaluation | X | ○ |

As illustrated in FIGS. 5, 7, 8, and 9, in the lubricant application devices 50, 50A, 50B, and 50C depicted in FIGS. 5, 7, 8, and 9, respectively, the solid lubricant 2 presses against the brush roller 3. The rotating brush roller 3 causes the solid lubricant 2 to become a powdery state, and causes the powdery lubricant to be applied to the photoconductor 1. When the rotating brush roller 3 contacts the solid lubricant 2, bristles of the brush roller 3 fall down or are bent, and after the contact with the solid lubricant 2, the fallen bristles stand up. A restitution force causes the bristles of the brush roller 3 to scatter the lubricant adhered to the bristles to attach to inside of the casing 4 around the brush roller 3. Similarly, when the rotating brush roller 3 contacts the photoconductor 1, bristles of the brush roller 3 fall down or are bent, and after the contact with the photoconductor 1, the fallen bristles stand up. A restitution force causes the bristles of the brush roller 3 to scatter the lubricant adhered to the bristles to attach to inside of the casing 4 around the brush roller 3. The lubricant scattering prevention members 5 and 10 cause the scattered lubricant to remain in the space 22, and prevent the lubricant from scattering from the space 22 through the opening.

As illustrated in FIG. 4, in a process cartridge (e.g., the image forming station 110C), the charging roller 16 uniformly charges the photoconductor 1. The charging roller 16 may use a scorotron system using a wire, a corotron system, a contact roller charging system using a medium resistance rubber roller, and a non-contact roller charging system. The charging roller 16 according to the above-described exemplary embodiments uses the non-contact roller charging system.

Both the contact roller charging system and non-contact roller charging system have a method of overlaying direct current with alternating current and a method of applying only direct current. In the contact roller charging system, the method of overlaying direct current with alternating current may obtain higher quality images than the method of applying only direct current. However, filming of the photoconductor 1 may occur. Further, although constant current control of alternating current has an advantage of providing no effect on surface potential due to fluctuation of a resistance value of the charging roller 16 caused by environmental change, increased costs of high-voltage power supply and noise of high frequency alternating current may be generated. When only direct current is applied, since the fluctuation of the resistance value of the charging roller 16 caused by environmental change affects the surface potential, an applied voltage correction device may be needed.

In the non-contact roller charging system, in a case of non-contact charging, constant current control of alternating current causes a faulty image (e.g., an image having uneven density) due to an effect of fluctuation in the size of the gap between the photoconductor 1 and the charging roller 16. Therefore, as with the case of applying only direct current, the applied voltage correction device may be needed. However, the non-contact roller charging system may not contaminate the photoconductor 1 as easily as the contact roller charging system because the charging roller 16 does not contact the photoconductor 1 in the non-contact roller charging system.

Correction methods include a method of detecting a temperature in the vicinity of the charging roller 16 to switch applied voltage, a method of periodically detecting adherents on the photoconductor 1 to switch applied voltage, and a method of determining applied voltage based on a feedback current value. By using the above methods, a surface of the photoconductor 1 is charged to a voltage of from about −500V to about −700V. A driving method includes a method of pressing the charging roller 16 against the photoconductor 1 to rotate by frictional force and a method of receiving driving force from a gear of the photoconductor 1. Low-speed machines may use the method of pressing the charging roller 16 against the photoconductor 1 to rotate by frictional force, while high-speed machines for forming a high-quality image may use the method of receiving driving force from a gear of the photoconductor 1.

When adherents are adhered to a surface of the charging roller 16, a charging ability of a portion of the charging roller 16 on which the adherents are adhered is degraded. Thus, the charging roller 16 may not charge the photoconductor 1 with a desired electric potential. As a result, a faulty image caused by a charging failure is generated. In order to prevent such an image, the charging roller cleaner 18 contacts the charging roller 16. The charging roller cleaner 18 includes a brush roller having fibers on a metal shaft by using an electrostatic flocking method and a melamine roller on which a melamine resin is provided around a metal shaft. In most cases, the melamine roller is used in order to achieve a long lifetime. When slipping occurs between the charging roller cleaner 18 and the charging roller 16, the adherents are adhered to the surface of the charging roller 16, thereby accelerating formation of the faulty image due to the adherents. The rotating charging roller cleaner 18 driven by the rotating charging roller 16 without receiving particular driving force removes the adherents from the surface of the charging roller 16. When the driving force is applied to the charging roller cleaner 18, slipping occurs due to a tolerance of a diameter of the charging roller 16 and a tolerance of a diameter of the charging roller cleaner 18, resulting in a shortened lifetime. The charging roller 16 and the charging roller cleaner 18 preferably rotate at a common surface speed at contact portions at which the charging roller 16 contacts the charging roller cleaner 18 to prevent slipping.

The cleaning blade 14 may use a cleaning blade method in which a polyurethane rubber contacts the surface of the photoconductor 1 in a counter direction and an edge portion of the cleaning blade 14 scrapes residual toner after transfer. The waste toner collection coil 20 collects and conveys the toner scraped by the cleaning blade 14 to a waste toner tank, not shown, through the waste toner conveyance path. The waste toner tank stores the toner. The collected waste toner is not reused.

The lubricant is applied to the surface of the photoconductor 1 in order to maintain the friction coefficient on the surface of the photoconductor 1 at a low level. The lubricant is applied to prevent filming of the photoconductor 1. The lubricant presses against the brush roller 3, and as the brush roller 3 rotates, the lubricant is gradually scraped and applied to the surface of the photoconductor 1. The lubricant applied on the surface of the photoconductor 1 is uniformly affixed to the surface of the photoconductor 1 by the lubricant application blade 15. The lubricant includes zinc stearate (ZnSt). The brush roller 3 includes insulating PET (polyethylene terephthalate), conductive PET, and acrylic fiber.

Figure 11A:
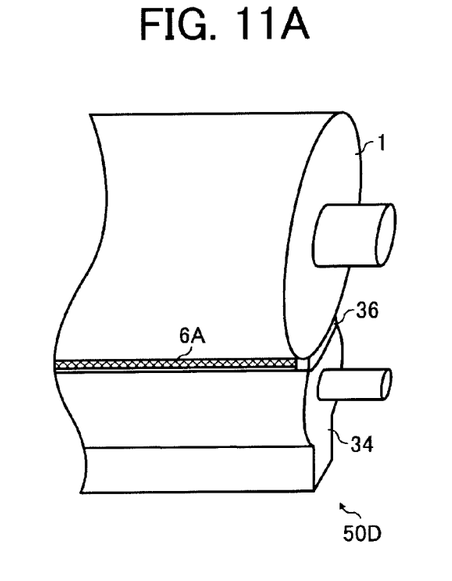
FIG. 11A is a partial perspective view of a lubricant application device according to another exemplary embodiment of the present invention.
Figure 11B:
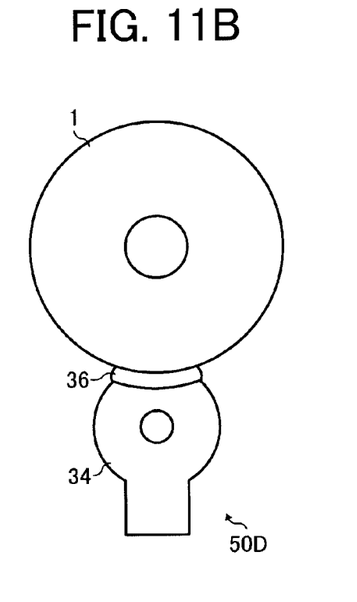
FIG. 11B is a side view of the lubricant application device shown in FIG. 11A.
Figure 12:
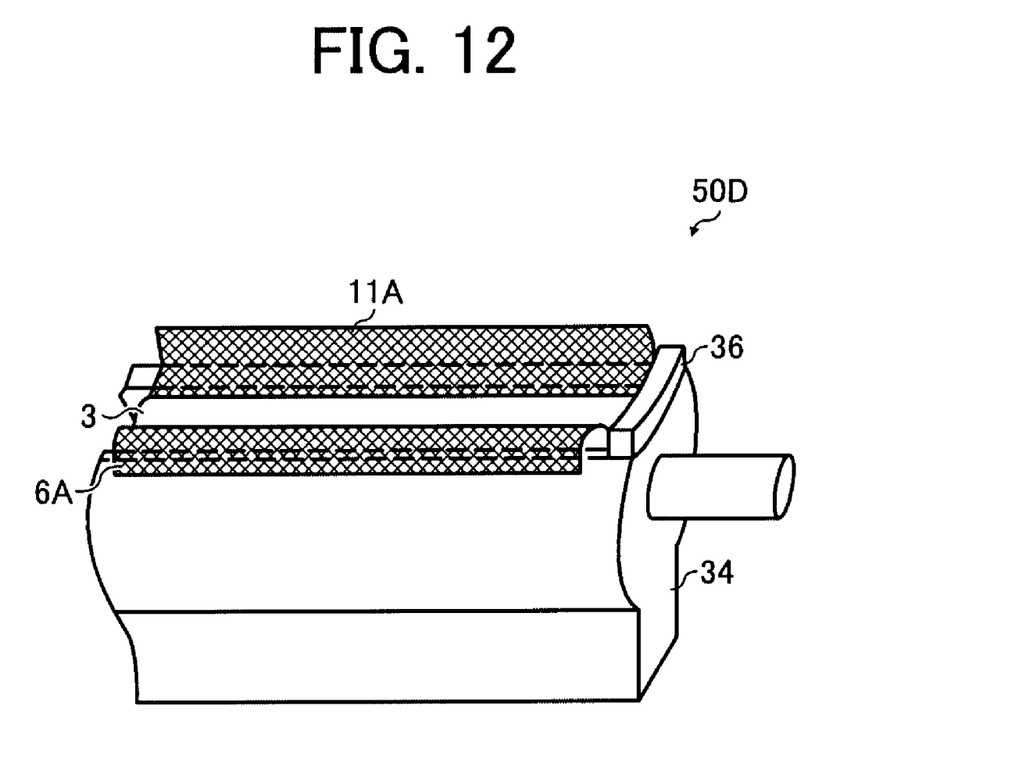
FIG. 12 is a perspective view of a frame included in the lubricant application device shown in FIG. 11A.
Figure 13:
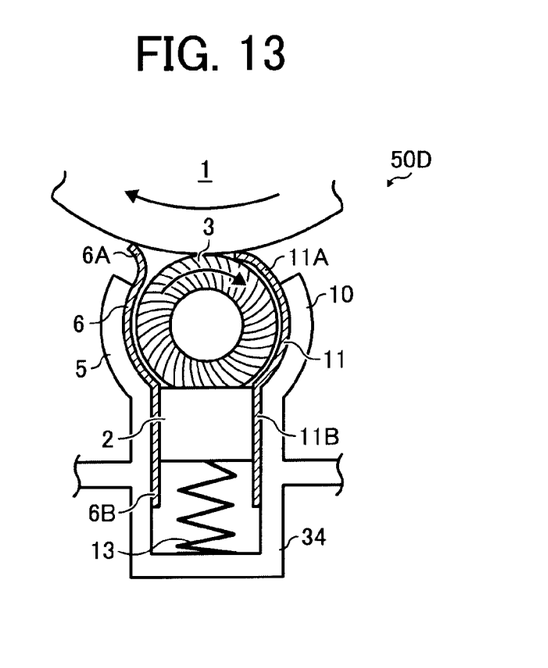
FIG. 13 is a sectional view of the lubricant application device shown in FIG. 12.

FIG. 11A is a partial perspective view of a lubricant application device 50D. FIG. 11B is a side view of the lubricant application device 50D. FIG. 12 is a perspective view of the lubricant application device 50D. FIG. 13 is a sectional view of the lubricant application device 50D. As illustrated in FIGS. 11A and 11B, the lubricant application device 50D includes the photoconductor 1, the top edge 6A, a casing 34, and an elastic member 36. The other elements of the lubricant application device 50D are common to the lubricant application device 50 depicted in FIG. 5.

As illustrated in FIG. 5, in the lubricant application device 50, the openings formed between the lubricant scattering prevention members 5 and 10 and the photoconductor 1 are sealed by the sheets 6 and 11. However, the sheets 6 and 11 may not seal gaps formed between the brush roller 3 and the solid lubricant 2 and the casing 4 at both ends of the brush roller 3 and the solid lubricant 2 in the axial direction of the brush roller 3. Thus, the lubricant may scatter from the gaps at the both ends of the brush roller 3 and the solid lubricant 2. As illustrated in FIGS. 11A, 11B, 12, and 13, the lubricant application device 50D may provide improved sealing inside the casing 34 to prevent the lubricant from scattering.

The casing 34 serves as a frame, and surrounds or covers both ends of the brush roller 3 and the solid lubricant 2 in an axial direction of the photoconductor 1 along a direction substantially perpendicular to the axial direction of the photoconductor 1. Thus, the casing 34 prevents the lubricant from scattering from the both ends of the brush roller 3 and the solid lubricant 2 at which the brush roller 3 contacts the solid lubricant 2. The elastic member 36 is provided at end portions of circular parts of the casing 34. An upper surface of the elastic member 36 contacts the surface of the photoconductor 1 together with the top edges 6A and 11A of the sheets 6 and 11 protruding from openings formed between the circular parts of the casing 34 and the photoconductor 1, respectively. As illustrated in FIG. 13, the base edges 6B and 11B of the sheets 6 and 11, respectively, are preferably provided below a lowest part of a portion where the solid lubricant 2 and a box-like part of the casing 34 slide over each other.

Figure 14:
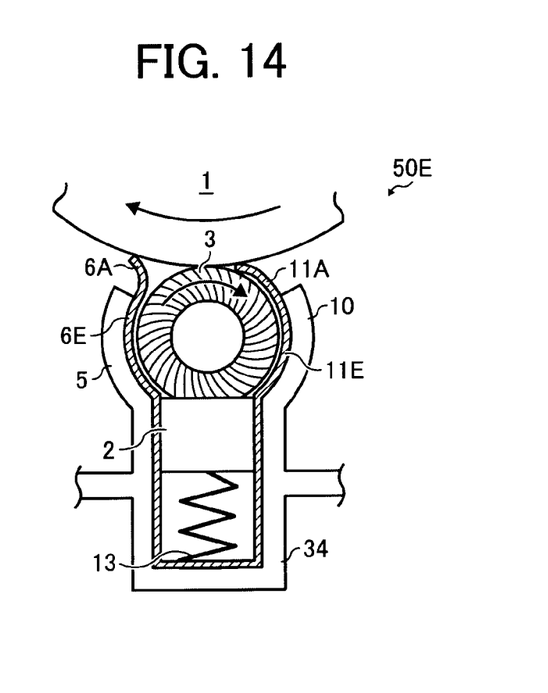
FIG. 14 is a sectional view of a modified example of a sheet included in the lubricant application device shown in FIG. 13.

FIG. 14 illustrates a lubricant application device 50E. The lubricant application device 50E includes sheets 6E and 11E. The other elements of the lubricant application device 50E are common to the lubricant application device 50D depicted in FIGS. 11A, 11B, 12, and 13. Although FIG. 13 illustrates an example in which the base edges 6B and 11B are separated from each other near a bottom of the box-like part of the casing 34, the base edges 6B and 11B may extend over an inner surface of the bottom of the box-like part so as to be combined as the sheets 6E and 11E illustrated in FIG. 14. Such a combination of the sheets 6E and 11E causes the solid lubricant 2 and the box-like part of the casing 34 to smoothly slide over each other while preventing scattering of the lubricant. Further, manufacturing efficiency may be improved and the number of elements may be reduced, resulting in cost reduction. In the lubricant application device 50E, the casing 34 is not included in a process cartridge, but may be included in a process cartridge like the casing 4 of the lubricant application device 50 depicted in FIG. 5.

As described above, the sheets 6, 6E, 11, and 11E contact the surface of the photoconductor 1 to seal the gaps formed between the photoconductor 1 and the both ends of the casing 34. The elastic member 36 prevents the lubricant from scattering from the gaps formed between the both ends of the solid lubricant 2 and the brush roller 3 in the axial direction of the brush roller 3.

Like the lubricant application device 50 depicted in FIG. 5, the lubricant application devices 50A, 50B, 50C, 50D, and 50E depicted in FIGS. 7, 8, 9, 12, and 14, respectively, may be included in the image forming apparatus 300 depicted in FIG. 3.

The image forming apparatus 300 may be provided with a process cartridge including the lubricant application device 50, or may be provided with the lubricant application device 50D or 50E separated from a process cartridge. Further, the structure of the casing 4 of the image forming station 110C (depicted in FIG. 4) serving as a process cartridge and the shapes of the lubricant scattering prevention members 5 and 10 integrated with the casing 4 (depicted in FIG. 4) are not limited to the examples shown in the above-described exemplary embodiments, and do not exclude a different structure and shape. One of the lubricant scattering prevention members 5 and 10 may be included in the lubricant application device 50, 50A, 50B, 50C, 50D, or 50E. Thus, the image forming apparatus 300, the process cartridge (e.g., the image forming station 110C), and the lubricant application devices 50, 50A, 50B, 50C, 50D, and 50E according to the above-described exemplary embodiments may be applied to various modifications.

As illustrated in FIG. 4, according to the above-described exemplary embodiments, a first lubricant scattering prevention member (e.g., the lubricant scattering prevention member 5) is provided downstream from a contact position at which a brush (e.g., the brush roller 3) contacts a solid lubricant (e.g., the solid lubricant 2) and upstream from a contact position at which the brush contacts an image carrier (e.g., the photoconductor 1) in the direction of rotation C of the brush. Thus, when the brush scrapes the solid lubricant, and fallen bristles of the brush stand up to scatter a lubricant to inside of an image forming apparatus (e.g., the image forming apparatus 300) or a frame (e.g., the casing 4) around the brush, the first lubricant scattering prevention member may prevent the lubricant from scattering to the inside of the image forming apparatus or the frame around the brush, thereby preventing the lubricant from smearing the inside of the image forming apparatus or the frame.

According to the above-described exemplary embodiments, since one end of the first lubricant scattering prevention member contacts the solid lubricant, while another end of the first lubricant scattering prevention member contacts the image carrier, scattering of the lubricant may be prevented. Moreover, by using a sealing member (e.g., the lubricant scattering prevention members 5 and 10) having a decreased friction resistance, the solid lubricant may maintain slidability to contact the brush at a constant pressure, and may reduce wear of the image carrier. In addition, since the scattered lubricant is adhered to the brush or the image carrier, waste lubricant may be reduced so that consumption of the solid lubricant may be reduced. Since the scattered lubricant adheres to the brush or the solid lubricant due to an airflow generated by rotation of the brush or gravity, the scattered lubricant may be adhered to the photoconductor. Therefore, consumption of the solid lubricant may be reduced to extend a life of the solid lubricant. Further, a second lubricant scattering prevention member (e.g., the lubricant scattering prevention member 10) may prevent the scattering of the lubricant when the brush contacts the image carrier, and fallen bristles of the brush stand up after the brush separates from the image carrier. Additionally, scattering of the lubricant may be prevented since one end of the second lubricant scattering prevention member contacts the solid lubricant, while another end of the second lubricant scattering prevention member contacts the image carrier.

According to the above-described exemplary embodiments, sealing of gaps formed between the image carrier and the frame may prevent the lubricant from scattering from gaps between the solid lubricant and the brush, and between the image carrier and the brush in the axial direction of the image carrier. Further, by integrating the first and the second lubricant scattering prevention members with the frame, the number of elements may be reduced, and manufacturing efficiency may be improved, resulting in cost reduction, as well as improving sealing property. Sealing both ends of the brush and the solid lubricant may prevent the lubricant from scattering in the axial direction of the image carrier. Slidability of a contact portion of the frame and the solid lubricant may be improved. Further, a sheet-like member covering the frame from a portion contacting the image carrier to a portion contacting the solid lubricant may improve manufacturing efficiency and reduce material cost.

According to the above-described exemplary embodiments, long-life process cartridge and image forming apparatus may be provided at reduced costs.

As can be appreciated by those skilled in the art, although the present invention has been described above with reference to specific exemplary embodiments the present invention is not limited to the details of the embodiments described above, and various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. A lubricant application device, comprising:
    a solid lubricant configured to be in a non-contact state with a rotating member and provided below a horizontal line of an axis of the rotating member;
    a brush configured to rotate and contact both the solid lubricant and the rotating member; and
    a first lubricant scattering prevention member provided downstream from a first contact position at which the brush contacts the solid lubricant and upstream from a second contact position at which the brush contacts the rotating member in a direction of rotation of the brush.

2. The lubricant application device according to claim 1, wherein both ends of the first lubricant scattering prevention member in a direction perpendicular to an axial direction of the rotating member have a sheet-like shape, and are parallel to the axial direction of the rotating member and longer than the brush, and
    wherein one end of the first lubricant scattering prevention member contacts the solid lubricant, and another end of the first lubricant scattering prevention member contacts the rotating member.

3. The lubricant application device according to claim 2, wherein friction coefficients between the first lubricant scattering prevention member and the rotating member, and between the first lubricant scattering prevention member and the solid lubricant, are not greater than about 0.20.

4. The lubricant application device according to claim 2, wherein the first lubricant scattering prevention member includes a circular part, and a space of from about 0.5 mm to about 5 mm is provided between the circular part of the first lubricant scattering prevention member and the brush in the direction perpendicular to the axial direction of the rotating member.

5. The lubricant application device according to claim 1, wherein a horizontal line and a tangential line of the first lubricant scattering prevention member in the direction of rotation of the brush form an angle of from about 45 degrees to about 90 degrees at which a circular part of the first lubricant scattering prevention member contacts the solid lubricant.

6. The lubricant application device according to claim 1, further comprising a second lubricant scattering prevention member provided upstream from the first contact position at which the brush contacts the solid lubricant and downstream from the second contact position at which the brush contacts the rotating member in the direction of rotation of the brush.

7. The lubricant application device according to claim 6, wherein both ends of the second lubricant scattering prevention member in a direction perpendicular to an axial direction of the rotating member have a sheet-like shape, and are parallel to the axial direction of the rotating member and longer than the brush, and
    wherein one end of the second lubricant scattering prevention member contacts the solid lubricant, and another end of the second lubricant scattering prevention member contacts the rotating member.

8. The lubricant application device according to claim 7, wherein friction coefficients between the second lubricant scattering prevention member and the rotating member, and between the second lubricant scattering prevention member and the solid lubricant, are not greater than about 0.20.

9. The lubricant application device according to claim 7, wherein the second lubricant scattering prevention member includes a circular part, and a space of from about 0.5 mm to about 5 mm is provided between the circular part of the second lubricant scattering prevention member and the brush in the direction perpendicular to the axial direction of the rotating member.

10. The lubricant application device according to claim 6, wherein a horizontal line and a tangential line of the second lubricant scattering prevention member in a direction opposite to the direction of rotation of the brush form an angle of from about 45 degrees to about 90 degrees at which a circular part of the second lubricant scattering prevention member contacts the solid lubricant.

11. The lubricant application device according to claim 6, further comprising a frame configured to hold at least one of the solid lubricant and the brush, the frame integrated with the first and second lubricant scattering prevention members.

12. The lubricant application device according to claim 11, wherein the frame surrounds both ends of the brush and the solid lubricant in an axial direction of the rotating member along a direction substantially perpendicular to the axial direction of the rotating member.

13. The lubricant application device according to claim 12, further comprising an elastic member provided at end portions of the frame in an axial direction of the brush, the elastic member configured to contact the rotating member.

14. The lubricant application device according to claim 11, wherein each of the first and second lubricant scattering prevention members includes a slidable sheet-like member, and wherein one end of the sheet-like member in a direction perpendicular to an axial direction of the rotating member contacts the rotating member, and another end of the sheet-like member is provided on a contact portion at which the solid lubricant contacts the frame.

15. The lubricant application device according to claim 14, wherein another end of the sheet-like member is provided below a lowest part of a portion where the solid lubricant slides over the frame.

16. The lubricant application device according to claim 15, wherein the sheet-like members provided in the first and second lubricant scattering prevention members are integrated into a single sheet.

17. A process cartridge, comprising:
an image carrier configured to carry an image; and
a lubricant application device configured to apply a lubricant to the image carrier, the lubricant application device comprising:
   a solid lubricant configured to be in a non-contact state with the image carrier and provided below a horizontal line of an axis of the image carrier;
   a brush configured to rotate and contact both the solid lubricant and the image carrier; and
   a first lubricant scattering prevention member provided downstream from a first contact position at which the brush contacts the solid lubricant and upstream from a second contact position at which the brush contacts the image carrier in a direction of rotation of the brush.

18. An image forming apparatus, comprising:
an image carrier configured to carry an image; and
a lubricant application device configured to apply a lubricant to the image carrier, the lubricant application device comprising:
   a solid lubricant configured to be in a non-contact state with the image carrier and provided below a horizontal line of an axis of the image carrier;
   a brush configured to rotate and contact both the solid lubricant and the image carrier; and
   a first lubricant scattering prevention member provided downstream from a first contact position at which the brush contacts the solid lubricant and upstream from a second contact position at which the brush contacts the image carrier in a direction of rotation of the brush.

19. The image forming apparatus according to claim 18, wherein the image carrier and the lubricant application device form a process cartridge.

* * * * *